United States Patent
Ndili (10) Patent No.: US 6,950,881 B1
(45) Date of Patent: Sep. 27, 2005

(54) SYSTEM FOR CONVERTING WIRELESS COMMUNICATIONS FOR A MOBILE DEVICE

(75) Inventor: Awele Ndili, San Jose, CA (US)

(73) Assignee: MShift, Inc., San Jose, CA (US)

( * ) Notice: Subject to any disclaimer, the term of this patent is extended or adjusted under 35 U.S.C. 154(b) by 610 days.

(21) Appl. No.: 09/686,125

(22) Filed: Oct. 10, 2000

Related U.S. Application Data (60) Provisional application No. 60/204,502, filed on May 16, 2000, and provisional application No. 60/163,115, filed on Nov. 2, 1999.

(51) Int. Cl.[7] ............................................. G06F 15/16
(52) U.S. Cl. ........................... 709/246; 709/245; 707/4; 707/10; 707/523
(58) Field of Search ................................ 709/246, 245, 709/219, 203, 229, 200, 217; 707/4, 10, 523, 102, 3, 7, 260, 275; 455/406, 414, 415, 445; 715/513, 523, 200; 379/88, 224; 345/853; 370/338

(56) References Cited

U.S. PATENT DOCUMENTS

| | | | |
|---|---|---|---|
| 5,727,159 A | 3/1998 | Kikinis | 395/200.76 |
| 5,742,668 A | 4/1998 | Pepe et al. | 379/58 |
| 5,895,471 A | 4/1999 | King et al. | 707/104 |
| 5,933,778 A | 8/1999 | Buhrmann et al. | 455/461 |
| 6,154,738 A * | 11/2000 | Call | 707/4 |
| 6,173,284 B1 * | 1/2001 | Brown | 707/10 |
| 6,178,433 B1 * | 1/2001 | Nakamura et al. | 715/513 |
| 6,247,048 B1 * | 6/2001 | Greer et al. | 709/219 |
| 6,363,419 B1 * | 3/2002 | Martin, Jr. et al. | 709/219 |
| 6,430,624 B1 * | 8/2002 | Jamtgaard et al. | 709/246 |
| 6,473,609 B1 * | 10/2002 | Schwartz et al. | 455/406 |
| 6,535,896 B2 * | 3/2003 | Britton et al. | 715/523 |
| 6,539,422 B1 * | 3/2003 | Hunt et al. | 709/217 |
| 6,553,222 B1 * | 4/2003 | Weiss | 455/415 |
| 6,560,640 B2 * | 5/2003 | Smethers | 709/219 |
| 6,574,630 B1 * | 6/2003 | Augustine et al. | 707/10 |
| 6,661,784 B1 * | 12/2003 | Nykänen | 370/338 |

FOREIGN PATENT DOCUMENTS

| | | |
|---|---|---|
| WO | WO 97/27546 | 7/1997 |
| WO | WO 98/00787 | 1/1998 |
| WO | WO 99/17504 | 4/1999 |
| WO | WO 00/39666 | 6/2000 |

OTHER PUBLICATIONS

Real-time content-based processing of multicast video, Zhou et al, IEEE 1998.*

Comment on HDML Submission; www.w3.org/submission/1997/5/comment.html.*

Web Content Delivery to Heterogeneous Mobile Platforms—Gaedke, Beigl, Gellersen . . (1998);www.teco.edu/~gaedke/paper/1998–Incs1552.pdf.*

Eija Kaasinen et al, "Two Approaches to Bringing Internet Services to WAP devices", Computer Networks 33 (2000) pp. 231–246.

Timothy Bickmore et al., "Web Page Filtering And Re-Authoring For Mobile Users", XP-000920338, The Computer Journal, vol. 42, No. 6, Apr. 21, 1999, pp. 534–546.

"WAP Architecture", WAP Architecture version 3.0; Apr. 30, 1998; pp. 1–20.

* cited by examiner

*Primary Examiner*—Thong Vu
(74) *Attorney, Agent, or Firm*—Wilson Sonsini Goodrich & Rosati (57) ABSTRACT

A system is provided for exchanging communications between a mobile device and a network site. The system includes a the conversion engine that coupled to network site in response to a request signaled from the mobile device. The mobile device signals the request using a first language. The network site processes the request in a second language. The conversion engine converts communications from the first language to the second language to enable communications between the network site and the mobile device.

20 Claims, 9 Drawing Sheets

SYSTEM FOR CONVERTING WIRELESS COMMUNICATIONS FOR A MOBILE DEVICE

RELATED APPLICATIONS

This application claims priority to U.S. Patent App. No. 60/163,115, entitled Portal Configuration in Wireless Medium, to Moeller et al., filed Nov. 2, 1999; to U.S. patent application Ser. No. 09/513,554, entitled System and Automatic Data Retrieval on an Internet Protocol Network, to Ndili et al., filed on Feb. 25, 2000; and to U.S. Patent App. No. 60/204,502, entitled System for Providing Network Content to Wireless Devices, to Ndelie et al., filed May 16, 2000; all of which are incorporated by reference herein.

BACKGROUND OF THE INVENTION

1. Field of the Invention

This invention relates to the field of wireless communications. In particular, the invention relates to wireless communications exchanged between a mobile device and a network site using a language conversion engine.

2. Description of the Related Art

Wireless technology now enables mobile devices to wirelessly couple to networks such as the Internet. The mobile devices can couple to the networks to receive information and content.

Typically, mobile devices are programmed to use a single language. The language use by the mobile device determines which network sites can be accessed. In some countries and geographic regions, mobile devices favor one type of language. Information providers typically structure network sites to provide content to the mobile devices using the language that is more prevalent in that geographic region. This makes it difficult for devices using other languages to have the same breadth of network access.

SUMMARY OF THE INVENTION

One advantage of the invention is to enable mobile devices programmed in one language to access network sites structured to provide information using a second language.

A system is provided for exchanging communications between a mobile device and a network site. The system includes a the conversion engine that coupled to network site in response to a request signaled from the mobile device. The mobile device signals the request using a first language. The network site processes the request in a second language. The conversion engine converts communications from the first language to the second language to enable communications between the network site and the mobile device.

DETAILED DESCRIPTION

A. System Overview

Embodiments of the invention provide a conversion engine to enable mobile devices to retrieve content from network sites, where the mobile device and the network site use different languages. In one application, a conversion engine is used to couple mobile devices using a first language to a network site using a second language. This allows for a device that is operable using a first language to be coupleable to network sites that use either the first language or a second language.

In one embodiment, a mobile device is operable in a first wireless language. The mobile device is coupleable to the conversion engine to access network sites that would otherwise require the mobile devices to be operable in a second language.

Mobile devices include devices that are capable of wireless communications. Preferably, the mobile device is configured to communicate using wireless access protocol (WAP). The language used by the mobile device may be anyone of the languages mentioned in this application. Examples of mobile devices include wireless devices such as cell phones, smart phones, handheld computers and personal digital assistants (PDAs) that use wireless communications. Specific examples include Sprint PCS phones, Palm VII, and other PDAs that use wireless modems.

In one specific implementation, the mobile device is WAP enabled and programmed in a Handheld Device Markup Language (HDML). The WAP device is coupleable to the conversion engine to retrieve information from network sites that are otherwise programmed to communicate with mobile devices using Compact Hypertext Markup Language (CHTML).

An advantage provided by an embodiment of the invention is that mobile devices are enabled to communicate with different types of network sites, including network sites using languages other than those of the mobile devices. Thus, mobile devices have access to a greater number of network sites.

Another advantage is that mobile devices using a first language can be made to access network sites suited for mobile devices that are programmed to communicate in a second language. Some countries in particular favor one wireless language for WAP devices over other wireless languages. For example, it in Japan, most WAP devices use CHTML to communicate to network sites, while in other countries, most WAP devices use HDML. For example, currently in some countries such as Japan, HDML devices are precluded from communicating with the majority of available network sites which use CHTML.

An advantage of the invention is that WAP devices using one type of wireless language (i.e. HDML) can couple to network sites which can only communicate in another wireless language (i.e. CHTML).

Another advantage provided by an embodiment of the invention is that mobile device can retrieve content and information from network sites programmed with different languages. The mobile device may retrieve content from network sites programmed in different languages. The content may be retrieved on-the-fly, so that information from the different network sites is made available to the user of the mobile device automatically in response to the user's request.

An embodiment of the invention includes a system for exchanging communications between a mobile device and a network. The system includes a conversion engine. The conversion engine communicates with a mobile device to receive a request to access a network site. The mobile device communicates in a first language, and the network site includes resources programmed in a second language. The conversion engine converts the request from the mobile device from the first language to the second language. The conversion engine then retrieves content from the network site. To make the content available for the mobile device, the conversion engine converts the content be renderable on the mobile device in the first language.

The term network page refers to content rendered from a network site. When rendered, the network page may in fact appear on more than one screen shots of the mobile device. Currently, mobile devices can communicate with network sites using one language. Embodiments of the invention expand the ability of mobile devices to communicate with network sites using two or more languages.

As used herein, languages refers to programming used to coupling network sites and mobile devices. Examples of languages include HTML, CHTML, wireless markup language (WML), and HDML.

Conversion engine includes an assembly of one or more modules. The conversion engine is preferably located on a server or other computer. As used herein, modules includes programming that performs a stated function. Modules may be in the form of hardware, software, firmware, or a combination thereof. One or more modules and other parts of the conversion engine may be distributed between different computers.

Content refers to information that can be rendered when communication with the network site is established. Examples of content include pages rendered from network sites, text messages, links to other network sites, and logos. Another example of content includes media, such as provided by streaming media, including video and/or audio.

Another embodiment of the invention includes method for exchanging communications between a mobile device and a network site. A request to access a network site from a mobile device is received. The request is structured 1 in a first language. A content from the network site is retrieved in the second language. The content is signaled to the mobile device in the first language. In an embodiment, the first language allows for a single input entry per page rendered from the network site, and the second language allows for multiple input entries per page rendered from the network site.

For reference, CHTML is a W3 Consortium defined protocol for mobile devices. One notable characteristic of CHTML is that multiple input and entry fields can be provided on mobile devices that use this protocol. Another notable characteristic of CHTML is that is allows for diverse user interaction using select and limited input mechanisms, typically one or more buttons on the mobile device.

CHTML was adopted as a well-defined subset of Hypertext Markup Language (HTML), but scaled to better accommodate small information appliances such as smart phones and personal digital assistants (PDAs). Small information appliances have several limitations, including limited memory, low power processors, small displays, monochrome, and restricted input devices. Typically, CHTML excludes features such as JPEG images, tables, image maps, multiple character fonts and styles, etc.

Figure 1:
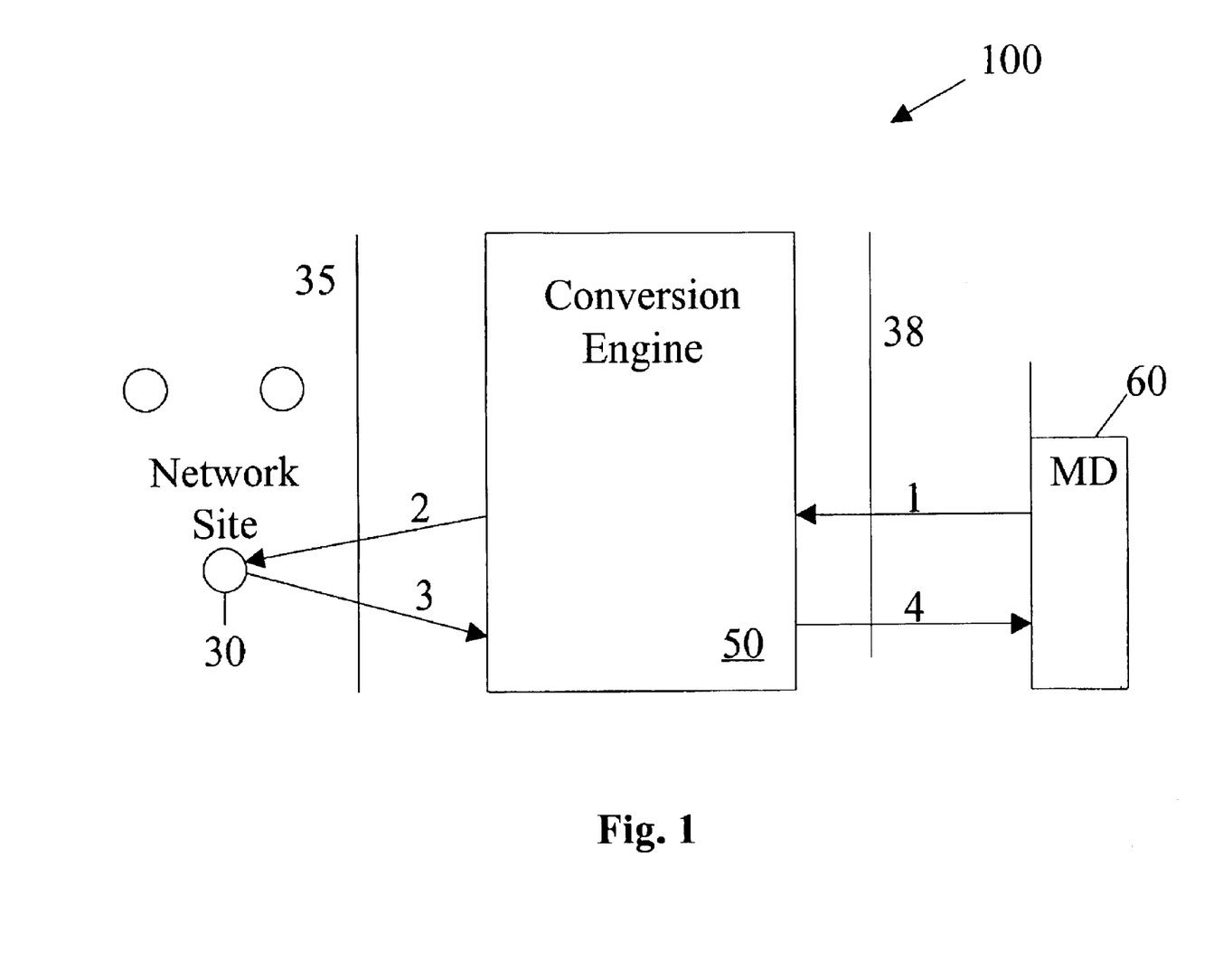
FIG. 1 is a block diagram illustrating a system for exchanging communications between a mobile device and a network site, each of which communicate using different languages, under an embodiment of the invention.

FIG. 1 is a block diagram illustrating a basic system architecture, under an embodiment of the invention. A system 100 includes a conversion engine 50. A mobile device 60 is coupled to the conversion engine 50 via a wireless connection. The conversion nodule 50 has access to a plurality of network sites 30 over network 35. The plurality of network site 30 may provide content and/or information in one or more formats. Reference to a particular format or format conversion is intended to mean that communications intended for or received from a network site are structured according to a designated language, such as industry standard programming for providing network pages to terminals and mobile devices. An example of network 35 includes the Internet. As an example, network sites 30 for use with an embodiment of the invention includes web sites with resources, files or other information structured to be rendered using HTML or CHTML.

The mobile device 60 signals a request 1 for content from a network site 30. The specific network site 30 may be a selection of the user of mobile device 60. The request may be initiated by manipulating or interacting with a user-interface feature of the mobile device 60. Typically, users may initiate request 1 using graphic input feature, an application button, or a combination thereof. For example, the user may select a bookmark corresponding to a favorite network page. Once initiated, request 1 is sent to conversion engine 50 via a wireless network.

Communications between the mobile device 60 and conversion engine 50 may be made via a wireless network 38. The request 1 may be transmitted to an uplink server (not shown) before being forwarded to a server where the conversion engine resides. The connection between the uplink server and the server hosting the conversion engine may be through a land based communication line. The conversion engine 50 may be located on one or more servers or computer systems coupled to the uplink server. The uplink server may be selected for communication with mobile device 60 based on the geographical location of mobile device 60.

In an embodiment, mobile device 60 is configured to communicate with a network using a first language. Therefore, request 1 is a communication transmitted using the first language. The network site 30 is configured to communicate with a mobile device (or other terminal or device) using a second language, where the second language is different than the first language. For example, the first language may be HDML, and the second language may be a version of HTML, and preferably CHTML.

The conversion engine converts request 1 from the first language into the second language. The conversion engine 50 forwards request 2 to the network site 30. The request 2 is used to access information and content from network site 30. In response to signaling request 2, conversion engine 50 is able to retrieve content 3 from network site 30. The content 3 is converted by conversion engine 50 into a newly formatted content 4. The newly formatted content 4 is signaled to mobile device 60.

Figure 2:
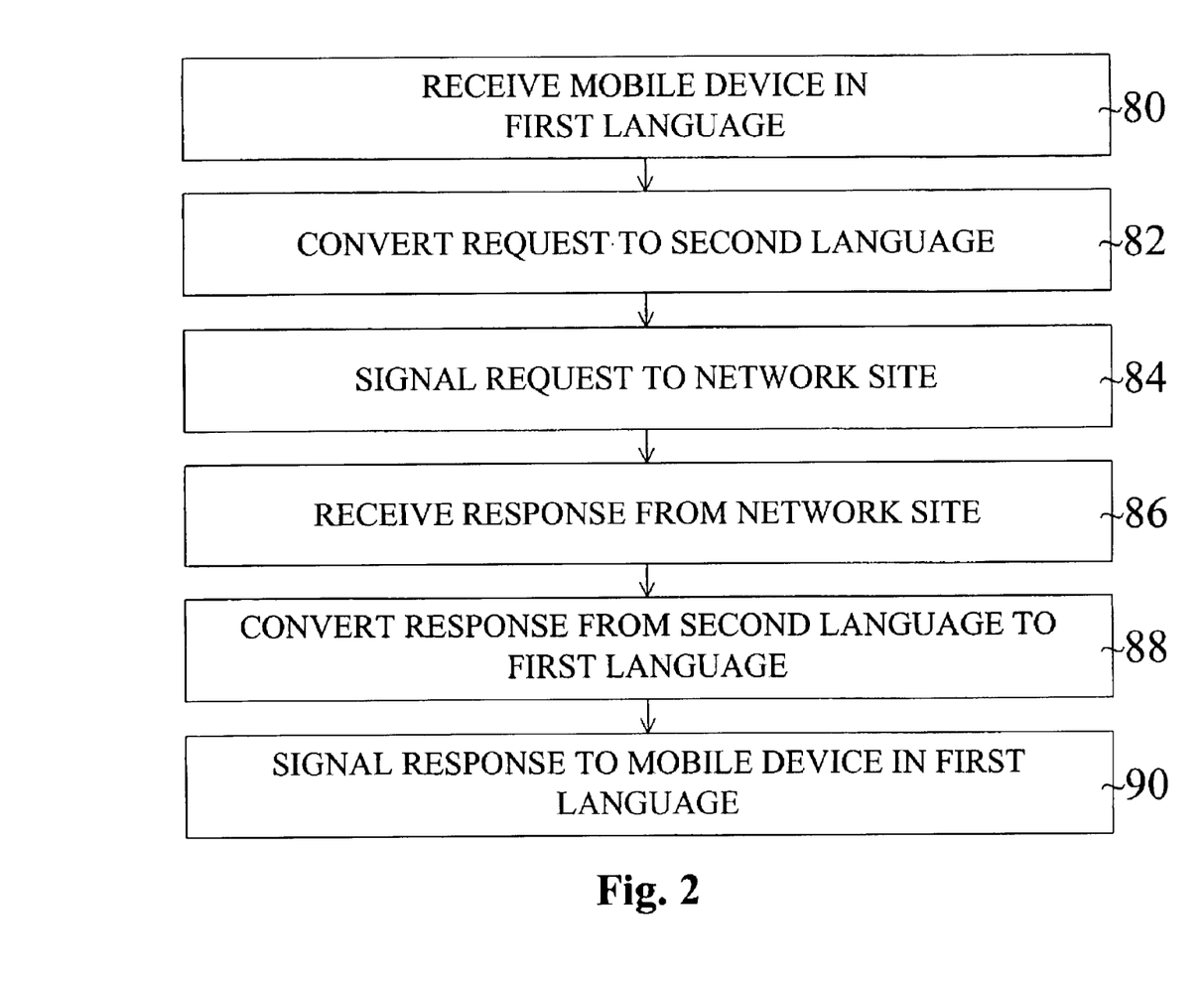
FIG. 2 is a flow process for coupling the mobile device to a conversion engine, under an such as described with FIG. 1.

FIG. 2 is a flow process illustrating communications exchanged between mobile device 60 and network site 30, under an embodiment of the invention. Reference to elements of FIG. 1 with description of this flow process is intended only to illustrate an exemplary configuration for the embodiment.

In step 80, conversion engine 50 receives a request from mobile device 60. The request is formatted in a first language used by the mobile device 60 for communications. For example, mobile devices 60 is assumed to use HDML to communicate with network sites on the Internet. Without use of conversion engine 50, mobile device 60 would only be able to access network sites containing files programmed in an HDML format. The conversion engine 50 may include a network interface (not shown) to receive the communications from the mobile device.

In step 82, the request from mobile device 60 is converted to the second language. The request may be converted by a conversion component (such as a module or program) of the conversion engine 50. The request is converted to the language used by network site 30. In an embodiment, the language of the network site 30 is CHTML.

In step 84, the converted request is signaled to network site 130. Then in step 86, a response to the request is retrieved (or fetched) by the conversion engine 50. In step 88, the conversion component of the conversion engine 50 converts the content retrieved from the network site into an HDML format. In step 90, the content received as a response form network site 30 is signaled to mobile device 60.

B. Converting Internal Links Between Wireless Languages

Figure 3:
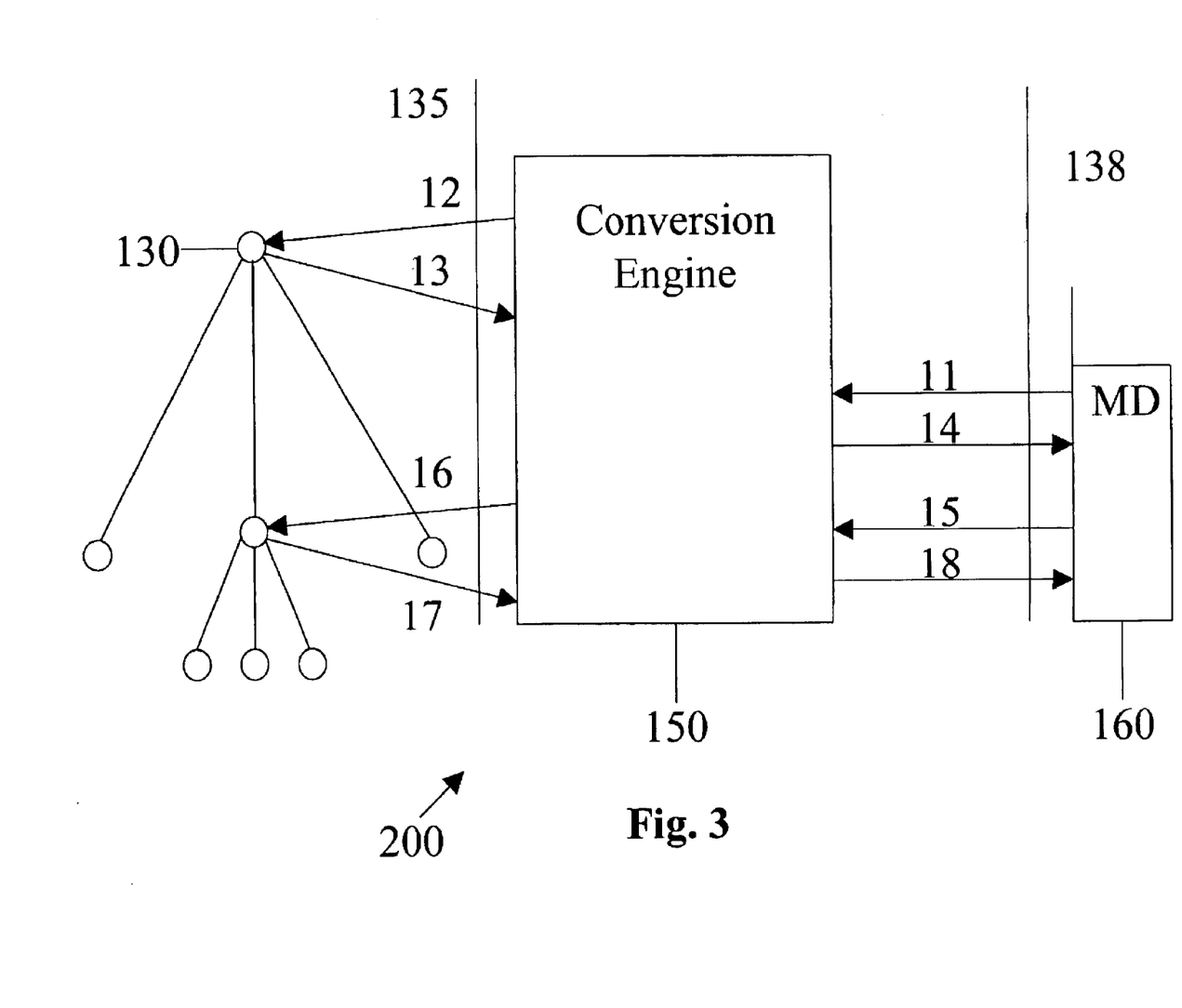
FIG. 3 is a block diagram illustrating a system for coupling a mobile device to a network site having one or more internal links, where the mobile device and network site communicate using different languages, under an embodiment of the invention.

FIG. 3 is a block diagram illustrating a system 200, under another embodiment of the invention. The system 200 includes a conversion engine 150 that is coupleable to mobile device 160 via a wireless network 138. The conversion engine 150 is also coupleable to network sites 130 via a network 135.

The system 200 illustrates an embodiment where internal links on the network site 130 are identified, then structured for mobile device 160. When structured, the internal links are renderable on the display of the mobile device in HDML. Further, the structured internal links are associated with an address that can be signaled to conversion engine 150 when the user of the mobile device 160 selects the internal link. The mobile device 160 is assumed to communicate using HDML, while network site 130 is assumed to communicate in CHTML.

In an embodiment, mobile device 160 signals request 11 to conversion engine 150 to retrieve content from network site 130. Request 11 is coded in HDML. The conversion engine 150 restructures the request from mobile device 160 and signals request 12 to network site 130 using CHTML. The conversion engine 150 receives content 13 from network site 130 that is coded in CHTML. The conversion engine 150 formats the content from the network site into HDML. The content is then transmitted with signal 14 to mobile device 160.

The network site 130 may include a plurality of internal links. As used herein, internal links of any network site are selectable representations of network addresses provided on that network site. For example, a page rendered from a network site may include links to other web sites.

FIG. 3 illustrates network site 130 to include internal links to network sites 132, 133 and 134. The internal links are selectable when content from network site 130 is rendered. As such, network sites 132, 133, 134 are internal links for network site 130. In FIG. 3, network sites 136, 137, and 138 represent internal links to network site 133. Thus, network sites 133 are internal links to network site 130. It is possible for a network site to have its own link as an internal link.

The content 13 would be renderable on a CHTML type device to provide content and information from network site 130. The content 13 would include selectable internal links to enable the CHTML type device to couple to other network sites. For an embodiment such as described with FIG. 3, conversion engine 150 identifies internal links from content 13. When converting content 13, conversion engine 150 restructures the internal links into HDML so as to be selectable on mobile device 160. Moreover, the internal links are structured so as to be selectable to signal in HDML the address of the corresponding network address 132, 133, 134 to conversion engine 150. The conversion engine 150 restructures the internal links to appear on the mobile device 160 as selectable user-interactive features. When a user-interactive feature is selected, the internal links signal conversion engine 150 to access the selected internal network sites 132, 133, 134 of network site 130.

A request 15 represents a selection made by the user of mobile device 160 to receive content from network site 133, located by the corresponding internal link displayed on mobile device 160 with content 14. The request 15 is signaled to conversion engine 150 in HDML. The conversion engine 150 converts request 15 to CHTML, which is then forwarded to network site 132 as CHTML request 16. The network site 133 retrieves CHTML content 17 from network site 132. The conversion engine 150 then converts CHTML content 17 to an HDML format. Signal 18 includes content from network site 133 in HDML. Signal 18 may include internal links located on network site 133.

Figure 4:
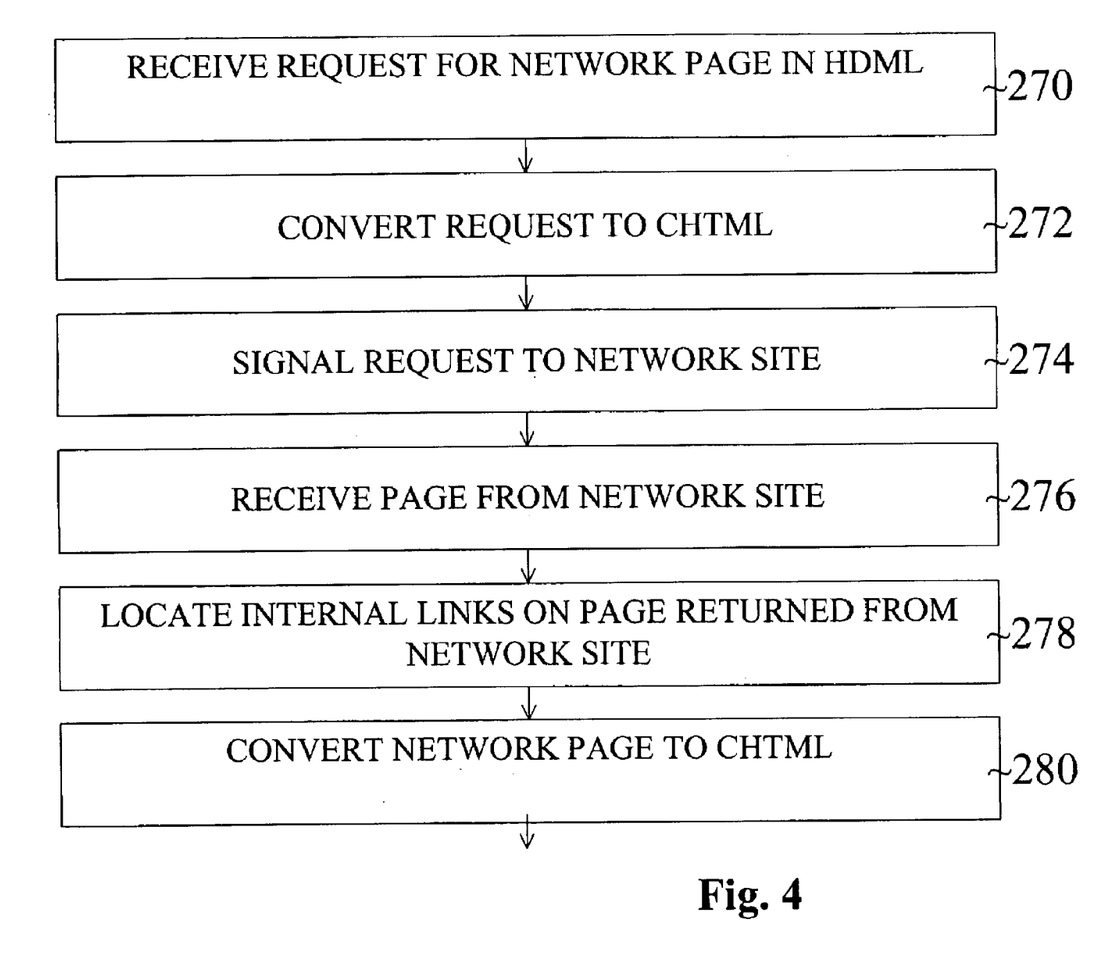
FIG. 4 is a flow process for coupling the mobile device to the conversion engine to enable the mobile device to retrieve content from a network site programmed in a different language, where the network site includes internal links that are to be provided to the mobile device, under an embodiment such as described with FIG. 3.

FIG. 4 is a flow processes for illustrating communications exchanged between mobile device 160 and network site 130, under an embodiment of the invention. Reference to elements of FIG. 3 with description of this flow process is intended only to illustrate exemplary configurations and components for use with this embodiment.

In step 270, mobile device 160 requests content from network site 130. The request is signaled using HDML. The conversion engine converts the request to CHTML in step 272, In step 274, request for content is signaled to network site 130, formatted in CHTML. A network page is returned from network site 130 in step 276. The network content may be retrieved or fetched after the request is signaled in step 274.

In step 278, conversion engine identifies links located on the network page retrieved from network site 130. The links identified on the network page correspond to internal links 132, 133, 134. In step 280, the network page is converted from CHTML to HDML. In step 282, the internal links are formatted to be displayed and selectable by mobile device. Specifically, the links are formatted to locate the internal network sites 132, 133, and 134 upon being selected. The addresses each link signals by its selection is formatted to be signaled in HDML to conversion engine 150.

In step 284, the network page retrieved from network site 130 is signaled to mobile device 160. The network page includes the formatted internal links, which are displayed on mobile device 160 for further selection.

After the page for network site 130 is rendered on mobile device 160, conversion engine 150 receives a request from mobile device 160 in step 286. The request is for a network page located by an internal link on network site 130. The request is in HDML. The rendered network page may include user-interactive features to allow the user of mobile device 160 to select an internal link appearing on that network page. For example, the internal links may appear as icons on the display of the mobile device 160.

In step 288, the request is converted from HDML to CHTML. It will be appreciated that the request for the internal link is treated by conversion engine 150 in the same manner as the request for network site 130. This is possible because conversion engine 150 converted the internal links in step 282 to be selectable to locate corresponding network sites for conversion engine 150.

In step 290, a network page is retrieved for the selected internal link. The network page is retrieved in CHTML. The retrieved network page is converted to HDML in step 292. The network page located by the internal link is signaled to the mobile device 160 in step 294.

One advantage of the invention is that mobile device 160 is provided internal links for each rendered network page. The internal links provided are selectable to locate a corresponding network page without having to access the previous network site that provided the page being rendered on the mobile device 160.

C. Converting Input Between Wireless Languages

Figure 5:
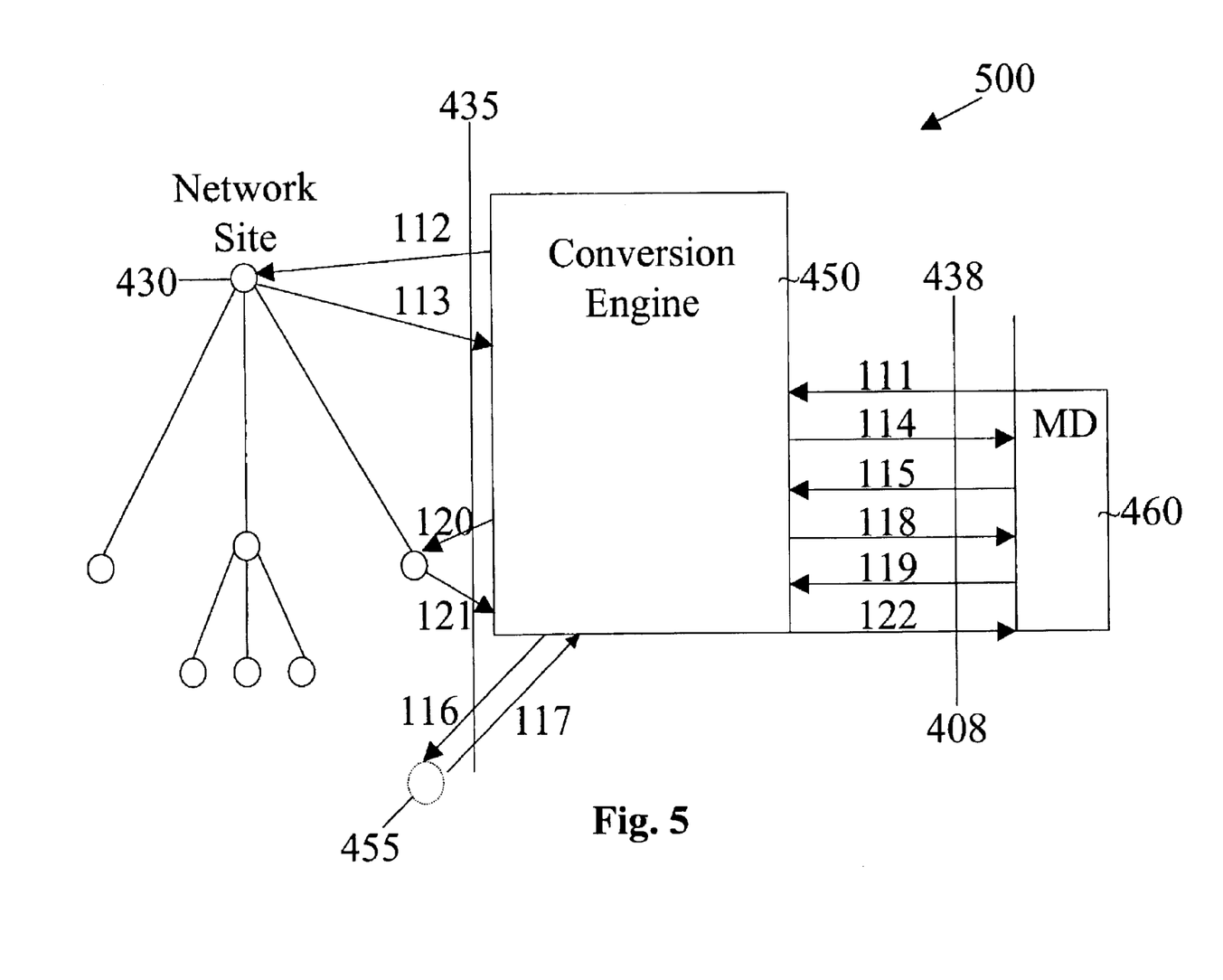
FIG. 5 is a block diagram illustrating a system for exchanging communications between the mobile device and the network site, each of which communicate using different languages, where the network site includes multiple input features for each page, under an embodiment of the invention.

FIG. 5 illustrates another embodiment of the invention in which input features included in the network page that is retrieved from a network site are formatted with other content and rendered on mobile device 160. The system 500 includes conversion engine, mobile device 460, and a plurality of network site 432. The conversion engine 450 is coupleable to the mobile device 460 and to the plurality of network sites 432. A wireless network 408 used to couple the mobile device 460 to the conversion engine 450. The wireless network may include an uplink server and a land communication system. A network 405 may be used to couple conversion engine 450 to network sites 430. An example of network 405 is the Internet.

The system 500 illustrates an implementation for converting input features from one language to another language. Specifically, wireless device 460 is assumed to communicate with network sites and other devices using a language that is limited in the number of input features that can be displayed. In one embodiment, wireless device 460 communicates in HDML, while network site 432 is assumed to use CHTML. Current versions of HDML are limited to displaying a single input feature per rendered network page. That is, when the HDML device retrieves a network page from a network site programmed in HDML, that network page can only have one text entry field, menu item, check-field etc.

In contrast, CHTML can be used to display multiple input features per rendered network page. For example, CHTML pages may display an application containing multiple input fields, including first name, last name, age, credit card number, etc.

One advantage provided with this embodiment is that it recognizes that when a CHTML network page is rendered on an HDML device, one or more input features provided on the network page may be unavailable. The system 500 enables all input features on a CHTML network site to be available when the page for that site is rendered on an HDML device.

With reference to FIG. 5, conversion engine 450 receives request 111 from mobile device 460. The request 111 is for a network page provided by network site 430. The conversion engine 450 converts the request 111 from HDML to CHTML. The request 112 is formatted in CHTML and directed to network site 430. The conversion engine 450 retrieves a network page 113 from network site 430. The network page is retrieved in CHTML. The conversion engine 450 converts the network page 113 to HDML. The network page is signaled as content 114 to mobile device 460.

In an embodiment, the page provided by network site 430 includes multiple input features. Input features include, for example, text-entry fields, icons, check-fields assigning Boolean values, and selectable items provided in a menu. As mentioned, current versions of HDML permit mobile device 460 to display or otherwise render only one input feature from each network page retrieved from network site 430.

In an embodiment such as shown by FIG. 5, the conversion engine 450 identifies the input features from the network page 113. The input features are reformatted into HDML type links. A function is associated with selection of the link. Therefore, each input feature provided on network site 430 is provided an HDML type link that is included in content 114. The HDML link is also provided with coding to instruct conversion engine 450 when the corresponding is selected. The functionality of the coding is described below.

Once network page 113 is e rendered on mobile device 460, the user can make a subsequent request 115 by selecting one of the HDML links that correspond to input features provided on network site 430. The user makes request 115 to signal a wish to make a specific input entry. Preferably, each HDML link is displayed with features such as wording or graphics so as to clearly indicate a wish by the user to make an entry for the input feature associated with that HDML link.

The request 115 is signaled to conversion engine 450 in HDML. The HDML link on which request 115 was generated includes code to enable conversion engine 450 to recognize the link as corresponding to a particular input entry on network site 430. In an embodiment, the code provided with the HDML link instructs conversion engine 450 to open and access a new network site 455. The new network site is preferably virtual, so that it exists only for the purpose of providing a platform for the user to signal input entries.

Signal 116 opens virtual site 455 according to code provided with the link from mobile device 460. Alternatively, code may be provided by conversion engine 450 to open virtual site 455. Once opened, a page 117 is retrieved from virtual site 455. The page is transmitted to mobile device 460 via signal 118, where the page for the virtual site 455 is rendered in HDML.

The user of mobile device 460 may enter input for virtual site 455. The input corresponds to what the user would enter in the corresponding input feature of network site 430, had the user been using a CHTML device. The mobile device signals input 119 to conversion engine 450. The conversion engine 450 converts input 119 into CHTML. The input 560 is signaled to network site 430 in CHTML, where it is entered.

Alternatively, the input 560 may be signaled to an internal network site 432, corresponding to where entry into input feature on the network page would be entered on network site 430. In some applications, entry into input features of network site 430 are equivalent to selecting internal links for other network sites. Thus, entry into virtual site 455 may subsequently be treated as selection of an internal link on network site 430.

The response 121 to entering the input entry for network site 430 is retrieved in CHTML. The response 122 is then signaled to mobile device 460.

An advantage provided by an embodiment of the invention is that HDML type mobile devices are provided the ability to perform tasks and functions that were not previously available. In particular, HDML type mobile devices 160 may be used with network sites that allow for multiple input features and entries. For example, with an embodiment of this invention, HDML type phones are now able to respond to network pages carrying applications, surveys, or virtually any other combination of two or more input features.

Other embodiments may provide for set network locations designated for receiving input from mobile device 460, rather than using virtual site 455. It is preferred to create the virtual site 455 after receiving a corresponding selection to enter input from mobile device 460. However, it may be preferable in certain situations to create all network sites for receiving input entries before signaling the network page in HDML to mobile device 460. For example, when long applications requiring extensive entry is required, it may be easier to create network sites for receiving each entry prior to signaling the network page to the mobile device in HDML.

D. Systems That Identifies The Mobile Device

Figure 6:
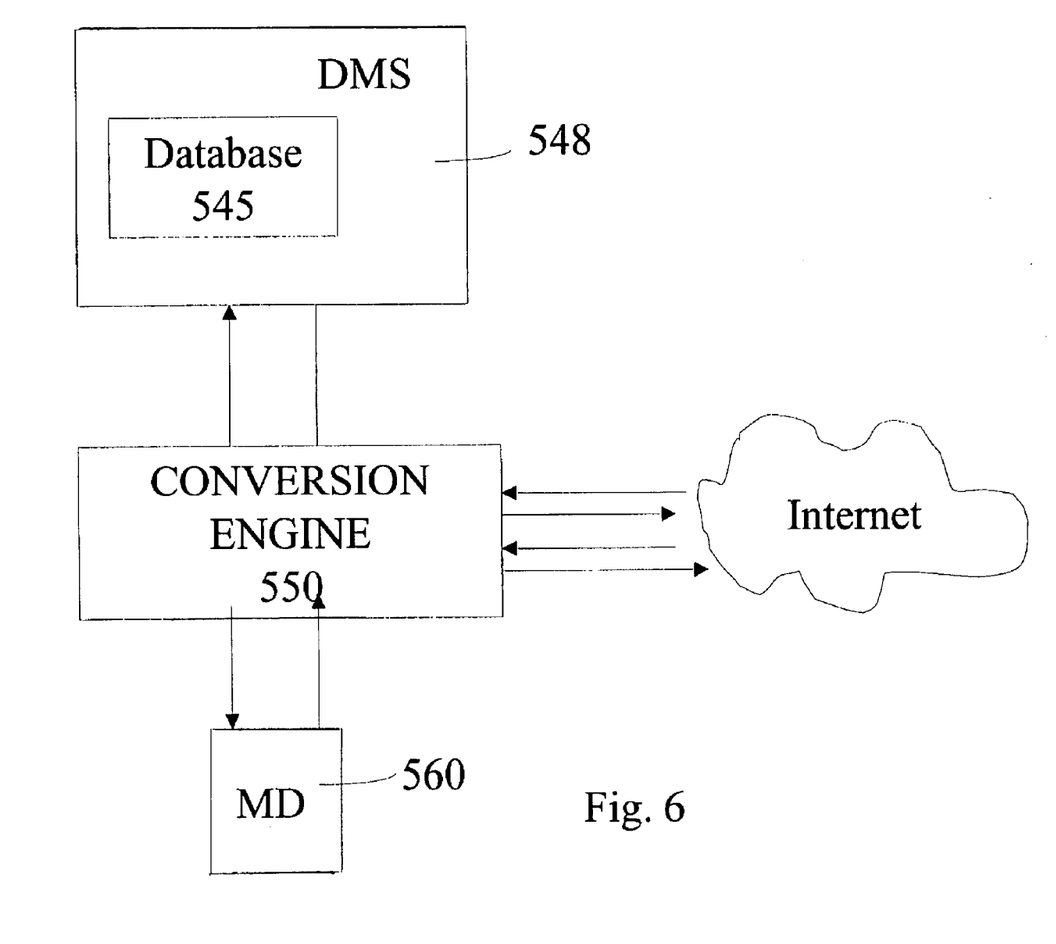
FIG. 6 is a flow process for coupling the mobile device to the conversion engine to enable the mobile device to retrieve content from a network site programmed in a different language, where the network site provides multiple input features for each page, under an embodiment such as described with FIG. 5.

FIG. 6 illustrates another embodiment of the invention, where conversion engine 550 is adapted to identify mobile device 560. In this embodiment, mobile device 560 may be operable in one of a plurality of languages.

The conversion engine 550 is coupled to a database 545. The database includes a database management system (DMS) 548, which is a module that identifies and retrieves information from database 545. The database 545 may store instructions for enabling conversion engine 550 to identify mobile device 560, as well as communicate with network sites on the network 535.

The signal 211 is a request from mobile device 560 to retrieve a page from a network site. The request is in the form of a card that provides the address of the network site being requested. The request 211 may also identify mobile device 560, including its language type.

In this illustration, mobile device 560 is assumed to be an HDML type device. The conversion engine transmits a request 212 to database 545. The request 212 provides DMS 548 with the selected network site and the type of mobile device 560 being used. A look-up table may be used, for example, to correlate the identification of mobile device 560 with a language. The DMS 548 selects instructions for converting the network page for the requested site to the language of the identified mobile device. The instructions 213 are signaled to conversion engine 550. Using the instructions, conversion engine 550 signals a request 214 to retrieve content from the network site selected on mobile device 560. A corresponding network page 215 is retrieved. The network page is converted by conversion engine 550 using the instructions from database 545. The converted network page 216 is signaled to mobile device 560.

It will be appreciated that in this system, mobile device 560 may use HDML, WML, CHTML, or other programming to communicate with network sites. The conversion engine is able to identify the type of device, as well as the selected destination of the user on an associated network. One function that can be performed by conversion engine 550 is to convert communications to and from mobile device 560 and network site between HTML or CHTML to HDML.

It an embodiment, a user defined database may be coupled to the system 600 to enable conversion engine 550 to use user-defined parameters in accessing network sites. Additional description of this feature is described with U.S. patent application Ser. No. 09/513,554, entitled System and Automatic Data Retrieval on an Internet Protocol Network, to Ndili et al., filed on Feb. 25, 2000, which is incorporated by reference in this application.

Figure 7:
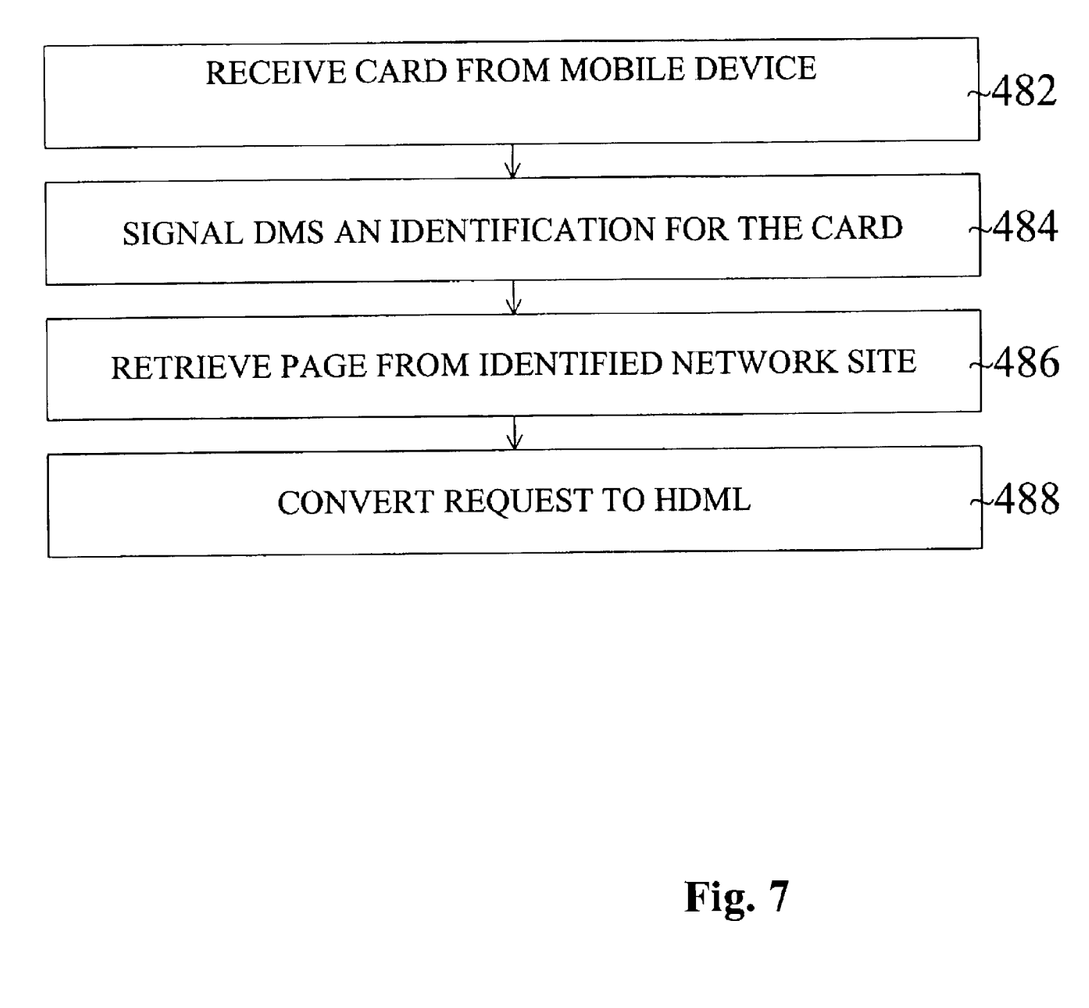
FIG. 7 is a block diagram illustrating a system for exchanging communications between the mobile device and the network site, where the system can identify the mobile device and determine if conversion is necessary, under an embodiment of the invention.

FIG. 7 illustrates a process that details conversion engine 550 interacting with mobile device 560, under an embodiment of the invention. For illustration, the process is described with reference to a uniform resource locator (URL) for an Internet site containing CHTML files. The mobile device 560 is assumed to be an HDML type device. Reference to elements of FIG. 6 is intended to be for illustrative purposes only.

In step 580, conversion engine 550 receives a card from mobile device 560. The card specifies an address, preferably in the form of an URL. The address is to locate the network site being requested by the use of mobile device 560. This communication is transmitted through a wireless medium in HDML.

In step 582, the conversion engine 550 signals DMS 548 the card received from mobile device 560. The DMS 548 is able to use information provided with the card to retrieve a set of instructions from database 545. The instructions are to programmatically control conversion engine 550 to assemble content accessible by the URL for mobile device 560. The conversion engine 550 may communicate with DMS 548 over a network such as the Internet. If the selected Internet site includes HTML or CHTML resources, the instructions include commands to "fetch" the URL, display the header and title for the URL, remove or replace header tags, display a welcome message provided on the URL, and exact a pertinent section of the web page located by the URL.

In particular, if the requested network site includes CHTML, the instructions provided by DMS 548 may be to replace tags formatted for CHTML with tags formatted HDML. With CHTML pages, the instructions may cause conversion engine 50 to remove images, such as provided in ""jpg" format. Other restructuring and formatting features may be included with the instructions to effectively convert communications between mobile device 560 and the selected CHTML site.

In step 584, the conversion engine 550 accesses the network site located by the URL to retrieve specific network sites. The network site is identified from the request signaled by mobile device 560.

In step 586, conversion engine 550 converts the page retrieved from the network site into HDML. In step 588, the content or network page is transmitted in the wireless protocol to mobile device 560. The network event or content may be formatted or otherwise paginated for a display of mobile device 560.

As described with embodiments of FIGS. 3 and 4, the instructions may also provide arguments and code to be included with internal links located on the requested network site. The arguments and code enable mobile device 160 to signal the internal network site using the corresponding link.

Further, as described with FIG. 5, an embodiment may provide for the instructions to direct conversion engine 550 to signal input features provided by the requested network site 530 as selectable links. The links may be selected to render a new network page for the mobile device. The user of the mobile device 560 may signal input using the created network page. The input is then forwarded to network sites located by the input features. This feature of the invention is particularly useful when the mobile device operates in HDML, and the network site is coded in HTML or CHTML.

E. Converting Between Languages For The Mobile Device

Figure 8:
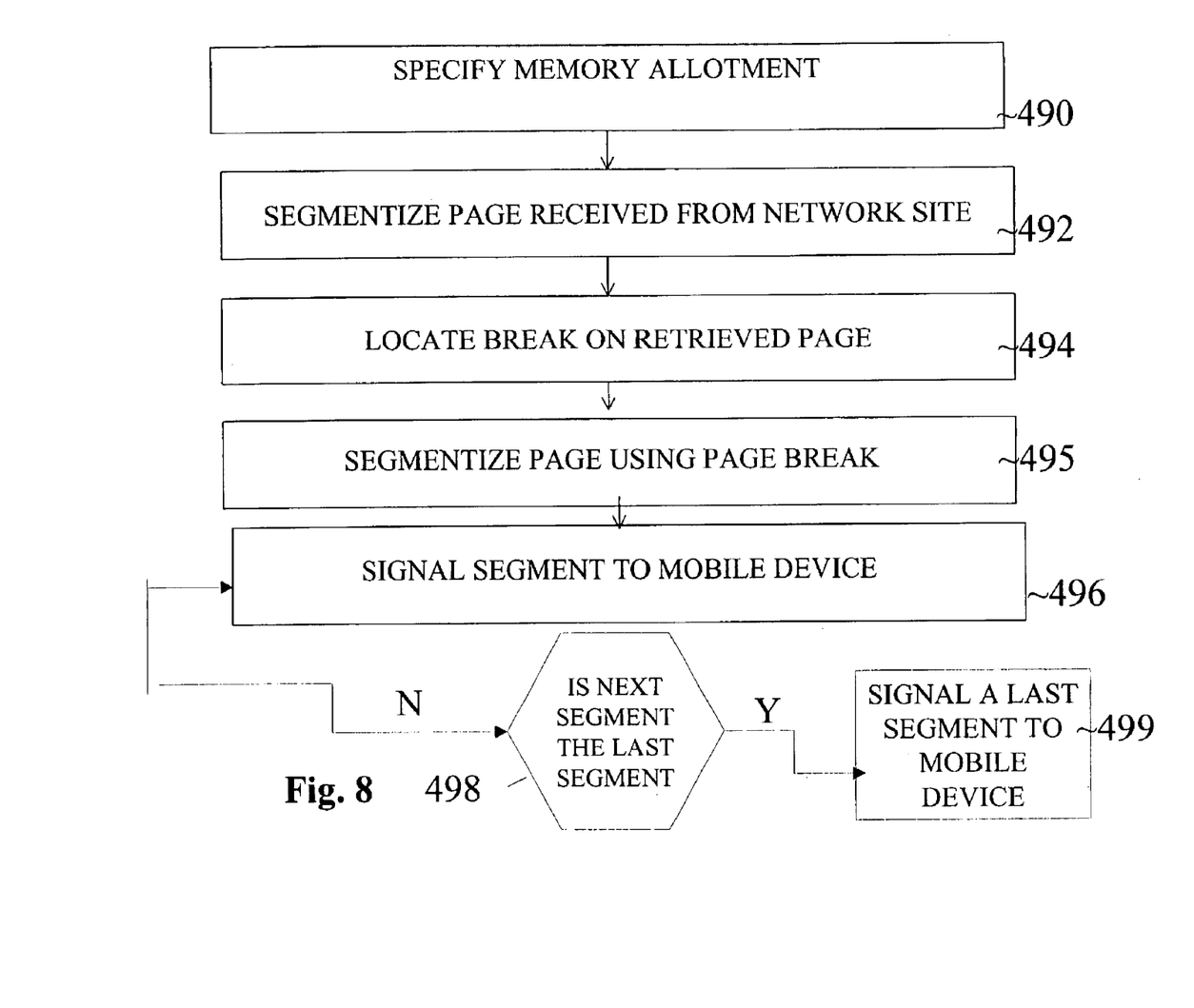
FIG. 8 is a flow process for segmenting a page from a network to fit on a small display screen of a mobile device, under an embodiment such as described with FIG. 7.

FIG. 8 illustrates a method performed by content engine 550 in paginating the network event into the wireless format. A process such as described with FIG. 8 enables events to be retrieved from IP sites and then converted for mobile devices 560. The content appearing on mobile device 550 is properly paginated for the screen of the mobile device 560, with no modification at the network site or mobile device 560. The process described with FIG. 8 assumes that content engine 550 has retrieved the network content from the network 135.

In step 590, a memory allotment is specified for mobile device 560. The memory allotment depends on the wireless protocol in use, and the desired page size which can be a function of the screen size of target mobile device 560. The memory allotment may be designated as, for example, 1 k, representing the average screen sizes WAP pages for mobile phones. Alternatively, a user of mobile device 560 may configure the memory allotment depending on the specific type and model of mobile device 560 being used. In an embodiment, the memory allotment is specified through user database 125.

In step 492, the content retrieved from the IP site is segmented according to the memory allotment. Each segment is portioned to correspond approximately to the memory allotment. The size of the segments allow each segment to be displayed in its entirety as one page on mobile device 550. As an example, if a journal article on a web site is 24 k in length, the article is segmented roughly into 24 k segments.

In step 494, a page break line or region is located on the retrieved network content corresponding to the boundary of each segment. The content engine 550 may locate a line or region where the 1 k break occurs.

Then in step 495, each segment is paginated on that page break line or region to ensure that the cut-off to a next segment is made at an appropriate place. If a segment of network content retrieved from the IP site is not paginated, HTML or CHTML coding may not correctly be converted to WML or HDML. In addition, words may be split up to appear on different pages on mobile device 550.

In an embodiment, a free unattached space is located to correctly paginate each segment on the page break line or region. For HTML or CHTML coding, the free unattached space is positioned outside of tags and other coding appearing on that portion of the network content. Specifically, the content engine 550 locates spacing outside of HTML open end and close end tags. As an example, the line of coding appearing on a page break line may be:

<a href=www.mobileshift.com>click here <br>to see </a>

The content engine 550 identifies spaces before "<a href", and after "<a>" as places where a page break may occur. The content engine 550 ignores spacing falling between the opening and closing of the <a> ... </a>tags. In this way, the page displayed on the screen of mobile device 550 contains entire words and code segments, and is coded from HTTP to WML or HDML appropriately.

To ensure the free unattached space is between an open or closed bracket, the content engine 550 may include coding that measures on the page break line the distance between the first located space and an open tag "<". The coding then measures the space between the located space and the closed tag ">". If the distance between the located space and the open tag is less than the distance between the located space and the open tag, then the located space is considered free and unattached. The located space is then made the location of a page break.

If the distance between the located space and the open tag is greater than the distance between the located space the close tag, then the located space is considered attached. A next space is then located on the break line. The next space may correspond to the space appearing to the right of the close tag. The spaces appearing on the page break line are checked in this manner until a free unattached space is located. Once the free unattached space is located, the segment is paginated.

In step 496, the segment is signaled to mobile device 560. The segment may be signaled with a user-interactive feature (icon) to signal a request for a next segment. In step 498, a determination is made as to whether a next segment is the last segment for the network content. If in step 498, a next segment is a last segment, then the last segment is signaled to mobile device 550 in step 499 as the last segment. If there is another segment, then steps 496–499 are repeated.

F. CONCLUSION

The foregoing description of various embodiments of the invention has been presented for purposes of illustration and description. It is not intended to limit the invention to the precise forms disclosed. Many modifications and equivalent arrangements will be apparent.

What is claimed is:

1. A system for exchanging communications between a mobile device and a network site, the system comprising:

a conversion engine coupleable to a mobile device to accept a request for a content from a network site, the request being signaled from the mobile device in a first language and the content being structured in a second language, the conversion engine being coupleable to the network site to retrieve the content from the network site in response to receiving the request; the conversion engine including logic to convert the content from the second language to the first language and signaling the content to be rendered as one or more pages on the mobile device, wherein the first language allows only a single input entry per page, and the second language allows for multiple input entries per page, and wherein the conversion engine restructures a plurality of internal links in the content rendered on the mobile device, and wherein the restructured internal links are selectable on the mobile device to generate a second request for another content from a second network site without the conversion engine converting the second request to the second language.

2. The system of claim 1, wherein the conversion engine identifies one or more input entries at the network site, and signals the input entries as selectable links to the mobile device.

3. The system of claim 2, wherein the conversion engine locates another network site for the mobile device in response to a user of the mobile device selecting each of the one or more input entries.

4. The system of claim 3, wherein the conversion engine identifies a text entry field on the network site, and converts the text entry field to a selectable link to a virtual network site created by the conversion engine, the virtual network site for the text entry field providing a corresponding text entry field for the mobile device.

5. The system of claim 3, wherein the conversion engine identifies a menu item on the network site, the menu item including a plurality of menu choices, the conversion engine converting the text entry field to a selectable link to a virtual network site created by the conversion engine, the virtual network site for the menu item displaying a link for each menu choice in the menu item.

6. The system of claim 3, wherein the conversion engine identifies a radio button on the network site, the radio button being selectable to enter a Boolean selection, the conversion engine converting the radio button into a selectable link to a virtual network site created by the network site, the virtual network site for radio button displaying a link for each Boolean value of the radio button.

7. The system of claim 3, wherein the conversion engine creates the virtual network site after the user of the mobile device selects a link corresponding to an input entry on the network site.

8. The system of claim 2, wherein the conversion engine locates another network site in response to a user of the mobile device selecting each of the one or more input entries.

9. The system of claim 1, wherein the first language is a version of a Handheld Device Markup Language (HDML), and the second language is a version of Hypertext Markup Language (HTML).

10. The system of claim 9, wherein the second language is a version of Compact HTML (CHTML).

11. The system of claim 1, wherein the conversion engine identifies an internal link on the network site, the internal link on the network site locating a second network site.

12. The system of claim 1, wherein the conversion engine includes a conversion engine that is coupleable to a database, the database including an instruction set for the mobile device, the instruction set being accessible by the conversion engine to convert the request from the mobile device and the content relieved from the network site.

13. A method for exchanging communications between a mobile device and a network site, the method comprising:
selecting a conversion engine that is in direct communication to a mobile device;
receiving a request to access content at a network site by the conversion engine from the mobile device, the request being received in a first language directly by the conversion engine;
retrieving a content having multiple input features from the network site in a second language by the conversion engine, wherein the first language allows only for a single input entry per rendered network page, and the second language allows for multiple input entries per rendered network page;
converting the content from the network site by the conversion engine from the second language to the first language, wherein each of the multiple input features within the content is reformatted into a selectable link;
signaling the content to be rendered as one or more network pages on the mobile device in the first language including a selectable link corresponding to each of the multiple input features within the content to generate at least a second request from a second network site without requiring conversion of the second request by the conversion engine.

14. The method of claim 13, further comprising converting the request from the mobile device from the first language to the second language.

15. The method of claim 13, further comprising converting the content retrieved from the network site from the second language to the first language.

16. The method of claim 13, wherein retrieving a content from the network site includes identifying an internal link on the network site.

17. The method of claim 16, comprising formatting the internal link to be selectable on the mobile device to generate a second request, the mobile device being able to generate the second request to be communicable with the network site using the second language.

18. The method of claim 13, wherein the first language is a version of a Handheld Device Markup Language (HDML), and the second language is a version of Hypertext Markup Language (HTML).

19. The system of claim 18, wherein the second language is a version of Compact HTML (CHTML).

20. A system for exchanging communications between a mobile device and a network site, the system comprising:
a mobile device for making a request for a content from a network site, wherein the request is composed from a first language that allows multiple input entries per page, and the content from the network site is composed from a second language that allows multiple input entries per page;
a conversion engine that is directly linked to the mobile device to accept the request for the content from the network site, wherein the conversion engine is in communication with the network site to retrieve the content from the network site in response to receiving the request from the mobile device, the conversion engine including logic to convert the content from the second language to the first language and signaling the content to be rendered as one or more pages on the mobile device,
and wherein the conversion engine further restructures a plurality of input entries within the content into selectable links that can be rendered on the mobile device, and wherein each of the selectable links on the mobile device can be selected to generate a second request for another content from a second network site without requiring conversion of the second request by the conversion engine.

* * * * *

UNITED STATES PATENT AND TRADEMARK OFFICE
CERTIFICATE OF CORRECTION

PATENT NO. : 6,950,881 B1 Page 1 of 1
DATED : September 27, 2005
INVENTOR(S) : Awele Ndili It is certified that error appears in the above-identified patent and that said Letters Patent is hereby corrected as shown below:

<u>Title page,</u>
Item [60], Related U.S. Application Data, insert at the beginning,
-- Non-provisional application No. 09/513,554, filed on February 25, 2000, --.

<u>Column 1,</u>
Lines 6-14, replace with:
    -- This application is a continuation-in-part of Serial No. 09/513,554, filed February 25, 2000, which is incorporated herein by reference in its entirety and to which application we claim priority under 35 USC § 120. This application also claims benefit of U.S. Provisional Application No. 60/204,502, filed May 16, 2000; and U.S. Provisional Application No. 60/163,115, filed November 2, 1999, which are incorporated herein by reference in their entirety. --.

Signed and Sealed this

Sixth Day of December, 2005

JON W. DUDAS
*Director of the United States Patent and Trademark Office*